United States Patent [19]

Kobayashi

[11] Patent Number: 5,666,573
[45] Date of Patent: Sep. 9, 1997

[54] CAMERA WITH REWRITABLE MEMORY

[75] Inventor: Kiyotaka Kobayashi, Saitama, Japan

[73] Assignees: Fuji Photo Film Co., Ltd., Kanagawa; Fuji Photo Optical Co., Ltd., Saitama, both of Japan

[21] Appl. No.: 729,688

[22] Filed: Oct. 7, 1996

[30] Foreign Application Priority Data

Oct. 9, 1995 [JP] Japan ................................. 7-261777

[51] Int. Cl.⁶ .................................................. G03B 7/24
[52] U.S. Cl. ........................... 396/207; 396/300; 396/542
[58] Field of Search ....................................... 396/207, 300, 396/542

[56] References Cited

U.S. PATENT DOCUMENTS

| | | | |
|---|---|---|---|
| 4,832,275 | 5/1989 | Robertson | 242/71.1 |
| 4,834,306 | 5/1989 | Robertson et al. | 242/71.1 |
| 5,025,274 | 6/1991 | Pagano | 396/207 |
| 5,271,577 | 12/1993 | Takahashi et al. | 242/71.16 |
| 5,283,604 | 2/1994 | Aoshima | 396/207 |
| 5,407,146 | 4/1995 | Takahashi et al. | 242/71.1 |
| 5,467,156 | 11/1995 | Ezawa et al. | 396/207 |

*Primary Examiner*—W. B. Perkey
*Attorney, Agent, or Firm*—Sughrue, Mion, Zinn, Macpeak & Seas

[57] ABSTRACT

A microcomputer and an EEPROM are mounted on a flexible printed circuit board. A land of the flexible printed circuit board is fixed to the upper wall of a cassette chamber. Provided on the bottom surface of this land are a reflection type photosensor for reading a bar code of a photographic film cassette and a plurality of contacts. The reflection type photosensor and the plurality of contacts are exposed in the cassette chamber via an opening formed in the upper wall. A data input apparatus has a connector and a console unit. As the connector is inserted into the cassette chamber, each connector pin of the connector contacts each of the plurality of contacts to electrically connect the microcomputer to the data input apparatus. By manipulating the console unit of the data input apparatus, various sets of data are written in EEPROM via the microcomputer of the camera. Data in EEPROM is read by the data input apparatus.

6 Claims, 3 Drawing Sheets

CAMERA WITH REWRITABLE MEMORY

BACKGROUND OF THE INVENTION

1. Field of the Invention

The present invention relates to a camera having therein a rewritable memory, and more particularly to a camera capable of being electrically connected to an external apparatus via contacts formed in the cassette chamber for writing to and reading from the memory.

2. Description of the Related Art

Most cameras have a built-in microcomputer which electrically controls the camera operation. For example, a photometric correction amount, an autofocus correction amount, a flash level, a battery check level, and the like are stored in a memory. By using such data in the memory, the microcomputer performs a correction process, an automatic flash control, a battery replacement alarm process, and the like. Recent cameras have used non-volatile memories such as an EEPROM (Electrically Erasable & Programmable ROM) to which data is rewritable.

After manufacture of a camera, the performance of the camera is tested. In accordance with this performance test, data in EEPROM is corrected to proper data. In correcting data in EEPROM, an external apparatus is connected to the microcomputer for data read/write of EEPROM.

A photographic film cassette of the type 135 has a DX code representative of film information, the code being formed at the outer surface of the cassette. This DX code is constituted by a contact pattern of conductive and nonconductive areas. A camera adapted to the type 135 has a plurality of contact pins disposed in a cassette chamber. The contact pins contact the contact patterns of a photographic film cassette to read the DX code. For data read/write of EEPROM, the microcomputer is connected to an external apparatus via the contact pins. Therefore, terminals specialized to data read/write are not necessary so that cost and compactness of cameras can be improved.

Sales of photographic film cassettes of the type IX240 started in April of 1996. The detailed structure of the photographic film cassette of type IX240 is described in U.S. Pat. Nos. 4,832,275, 4,834,306, 5,271,577 (corresponding to Japanese Patent Laid-open Publication No. 3-37645) and 5,407,146 (corresponding to Japanese Patent Laid-open Publication No. 3-37645). One feature of this photographic film cassette is that the film leader is completely housed in the cassette and advanced out of the cassette by spool rotation. Another feature is that a transparent magnetic layer is formed on the back surface of the photographic film, in which layer photographing information and print information are recorded.

The type IX240 uses a bar code disk indicating film information. The bar code disk is fixed to one end of the spool and housed in the cassette shell. The cassette shell is formed with a window for exposing the record area of the bar code. A reflection type photosensor constituted by an LED and a light receiving element is disposed at the outside of the upper wall of the cassette chamber. While the bar code disk rotates together with the spool during film advance, the reflection type photosensor reads the bar code on the bar code disk via an opening formed in the upper wall of the cassette chamber.

A camera adapted to the type IX240 is not provided with a plurality of contact pins for contact with the contact pattern. U.S. patent application Ser. No. 08/408,817 filed on Mar. 23, 1995 (presently continuation-in-part numbered U.S. Ser. No. 08/579,994) has proposed to use the bar code reading photosensor of a reflection type for data read/write of EEPROM. An external apparatus used for data read/write has a connector having the same outer dimension as the cassette. A reflection type photosensor is disposed on the top face of the connector, in correspondence with the reflection type photosensor of the camera.

This approach of using the bar code reading reflection type photosensor is advantageous in that the camera is not required to prepare optical interface for data communications. However, for data read/write of EEPROM, a signal converter is required which converts electrical signals of "0" and "1" into two types of light pulses (optical pulses) having different pulse widths. Therefore, the structure becomes complicated and the cost increases.

For data read/write of EEPROM, the microcomputer is set to a data input/output mode. This mode is set by a combination of operations of a photographing mode switch and a shutter button which can be accessed externally. Therefore, the data input/output mode may be set inadvertently by a user. In this case, if the reflection type photosensor senses external light during this mode which uses light pulses for data transfer, data in EEPROM may be changed or lost.

SUMMARY OF THE INVENTION

It is a principal object of the present invention to provide a camera capable of data read/write of a memory without using a signal converter.

It is another object of the present invention to provide a camera capable of directly connecting the camera to an external apparatus for data read/write of a memory.

It is still another object of the present invention to provide a camera capable of connecting the camera to an external apparatus by using a small space, and at a low cost.

It is a further object of the present invention to provide a camera in which the connection area between the camera and an external apparatus is difficult to be touched by a user.

In order to achieve the above and other objects, a camera of this invention has a rewritable memory and a cassette chamber. Into this cassette chamber, a photographic film cassette is inserted via an entrance formed at the bottom of the chamber, with a bar code disk side oriented toward the inside of the chamber. The photographic film cassette in the cassette chamber rotates its spool when the film is advanced. While the bar code disk rotates together with the spool, a bar code formed radially on the bar code disk is read with a photosensor mounted on a circuit board. The circuit board is provided with a plurality of first contacts. As the connector of an external apparatus is housed in the cassette chamber, a plurality of second contacts formed on the top surface of the connector contact the plurality of first contacts. The external apparatus is electrically connected to the camera and performs data read/write of a memory.

According to the present invention, since a plurality of first contacts are formed at the deep area in the cassette chamber, an external apparatus and the camera can be electrically connected by using a small space, and at a low cost. Also since a plurality of first contacts are formed at the deep area in the cassette chamber, a finger will not reach the connection area under ordinary use conditions. Since the camera can be connected to the external apparatus only by inserting the connector of the external apparatus into the cassette chamber, a preparatory work for data read/write of the memory is simple.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENTS

Figure 1:
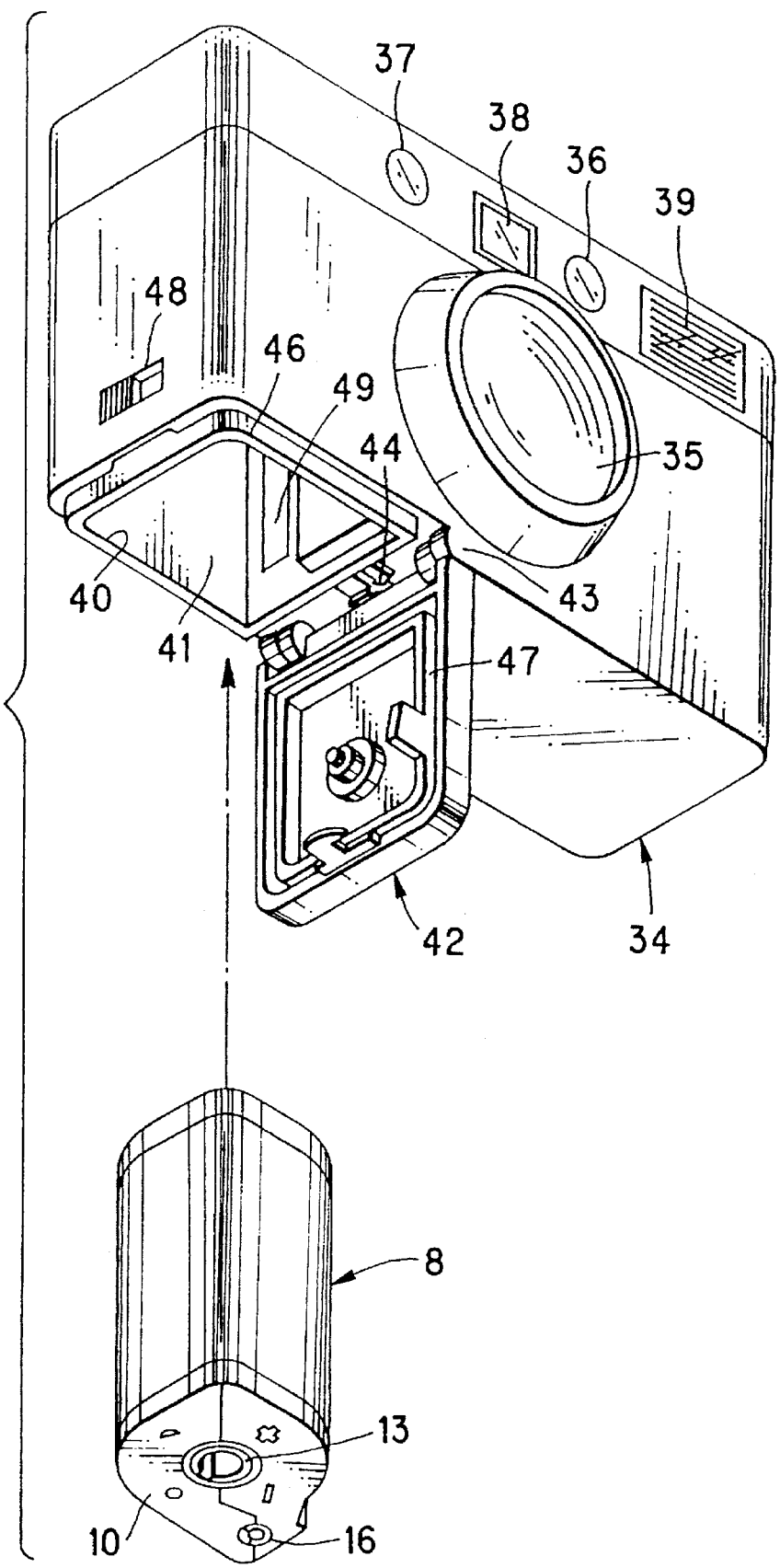
FIG. 1 is a perspective view showing the external appearance of a camera according to the invention.

Referring to FIG. 1, mounted at the front of a camera 34 are a taking lens 35, a light projecting window 36 for range finding, a light receiving window 37 for range finding, a viewfinder 38, and a flash window 39. Mounted at the top of the camera 34 are a shutter button, a power switch, a liquid crystal panel, and the like(not shown), as well known in this field. In the bottom plate of the camera 34, an entrance 40 is formed through which a photographic film cassette 8 of the type IX240 is inserted into a cassette chamber 41.

Figure 2:
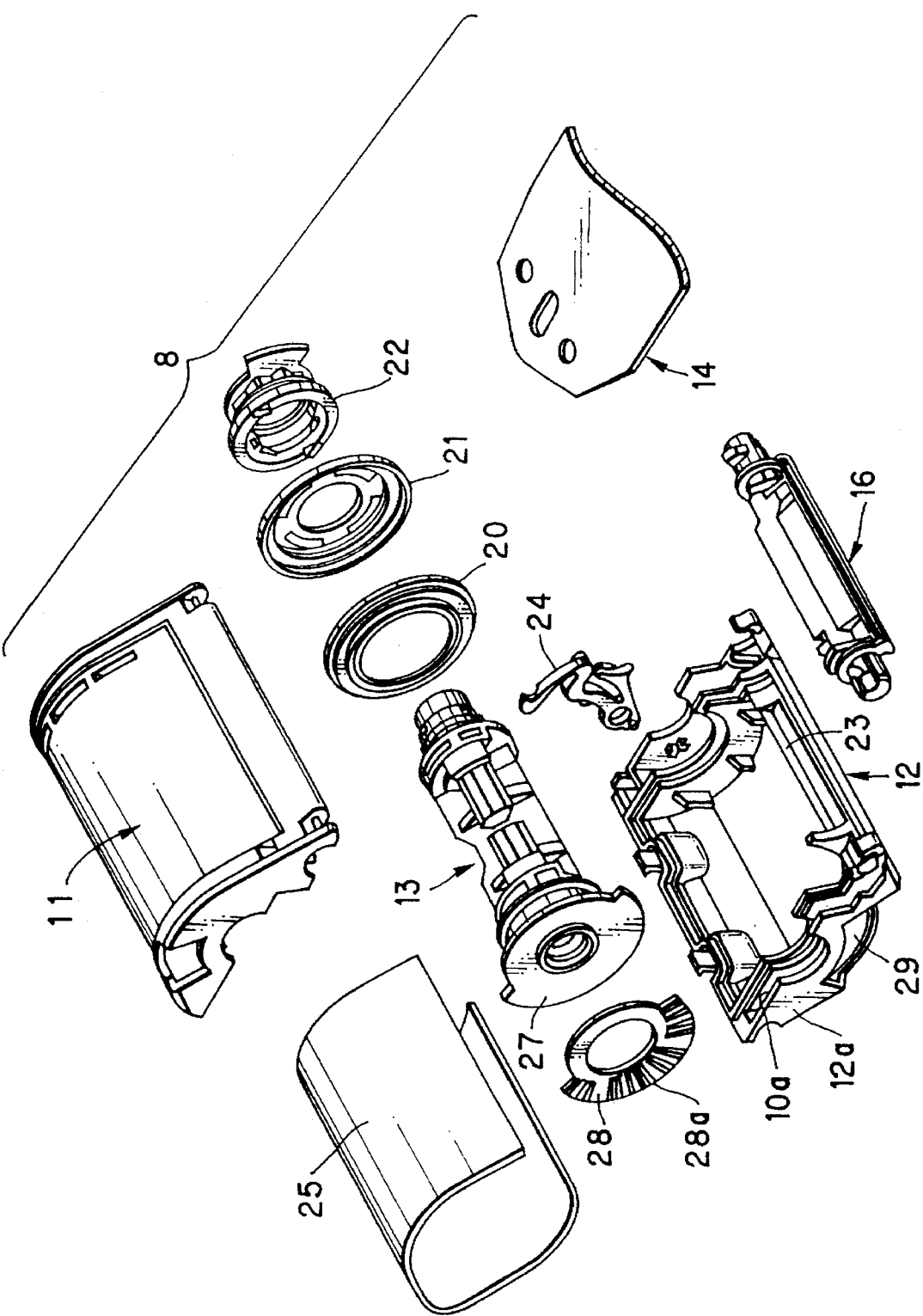
FIG. 2 is a broken perspective view of a photographic film cassette of type IX240.

As shown in FIG. 2, the photographic film cassette 8 is constituted by a cassette 10 (refer to FIG. 1) and a photographic film 14 housed in this cassette 10. The cassette 10 has a cassette shell and a spool 13. The cassette 10 is assembled by engaging two shell halves 11 and 12 of a generally semi-cylindrical shape. The spool 13 is rotatively housed in the cassette shell. The photographic film 14 is wound around the spool 13, with its rear end being attached to the spool 13.

On one end of the spool 13, a bar code disk 27 partially cut is formed. A label 28 is attached to the outer surface of the bar code disk 27, the label 28 having a bar code 28a which represents a photo sensitivity, a latitude, the number of available frames, and the like of the photographic film. Each bar of the bar code 29a extends radially. The bar code disk 27 is fitted in a groove 10a of the shell halves 11 and 12. One end 12a of the shell half 12 is formed with a window 29 for exposing the bar code 29a to the exterior.

A pair of flanges 20 and 21 are fitted around the spool 13 to hold opposite sides of the photographic film 14. At the other end of the spool 13, a mark disk 22 is mounted having a mark which indicates the use amount of the photographic film. As the spool 13 rotates, the leader of the photographic film 14 passes through a film mouth 23 and advances to the outside of the cassette 10. This film mouth 23 is opened and closed in response to an operation of a shutter 16. Reference numeral 24 designates a spool lock member, and reference numeral 25 designates a label printed with a film trademark and a manufacturer's name.

Referring back to FIG. 1, a bottom lid 42 is used for closing the entrance 40, and rotatively mounted on the bottom of the camera 34 by a pair of bearing members 43. A lock state of this bottom lid 42 is released by sliding a lock lever 48. Between the pair of bearing members 43, a plate spring 44 is disposed. This plate spring 44 abuts against one side of the bottom lid 42 on the bearing side to thereby maintain an open state of the bottom lid 42 when it is opened. Users, therefore, can be free from a cumbersome work of maintaining the open state of the bottom lid 42 with one hand which also holds the camera 34, in order to load the photographic film cassette 8.

A ridge or projection 46 is formed at the periphery of the entrance 40, and a groove 47 is formed in the inner wall of the bottom lid 42. When the bottom lid 42 is closed, the projection 46 is fitted into the groove 47 so that the inside of the cassette chamber 41 is shielded from external light.

At the inner side wall of the cassette chamber 41, a film inlet port or gate 49 is formed into which the photographic film 14 advanced from the photographic film cassette 8 is inserted. At the area facing the taking lens 35 and deeper than the film inlet port 49, an exposure aperture 51 (refer to FIG. 3) is formed and a pressure plate (not shown) is disposed. The exposure aperture 51 determines an exposure area of the photographic film 14, and the pressure plate makes the photographic film 14 flat. At the more deeper area, a film take-up chamber 50 (refer to FIG. 3) is provided for winding the exposed photographic film 14 in a roll.

Figure 3:
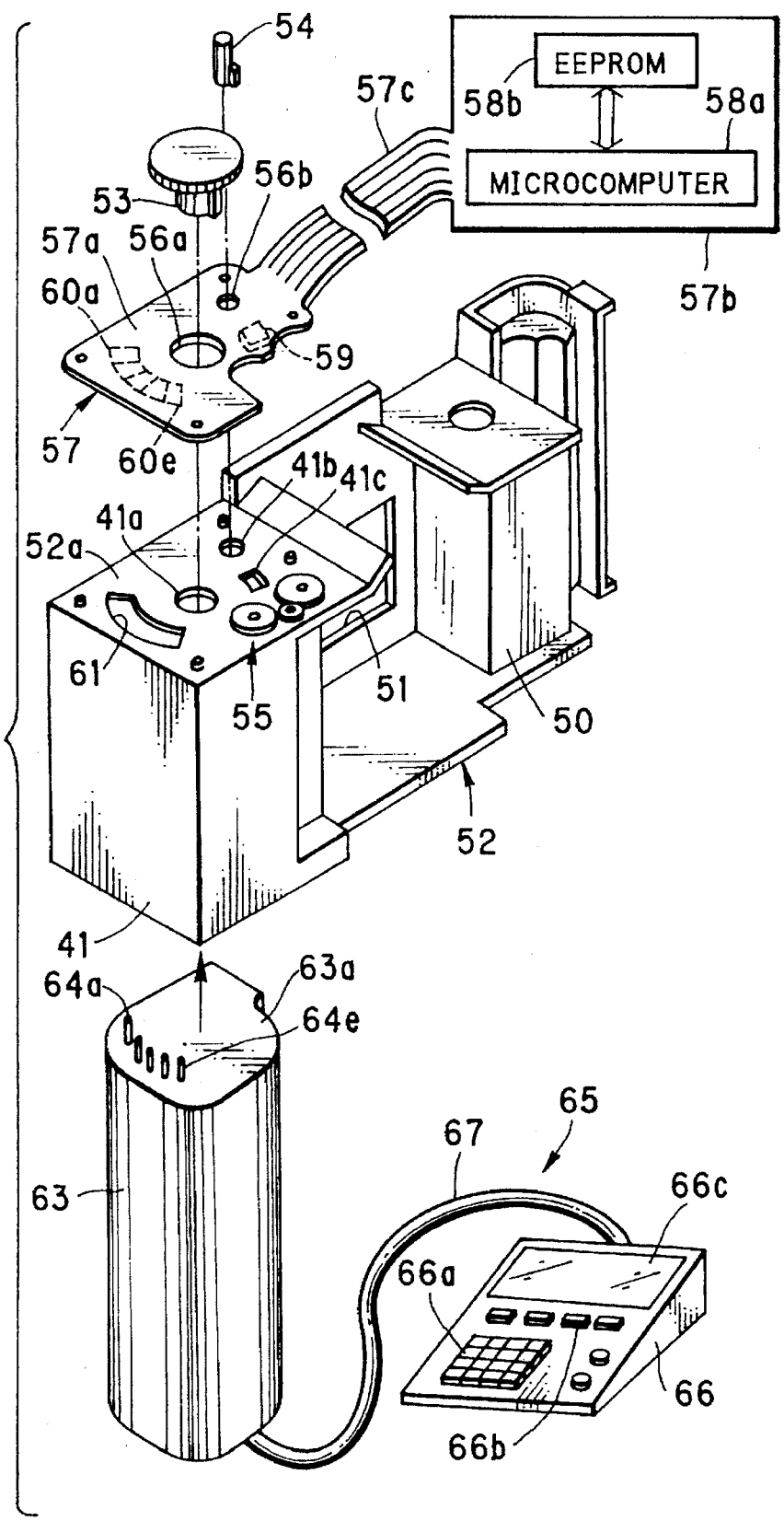
FIG. 3 is a broken perspective view showing the main part of the invention.

Referring to FIG. 3, a main body 52 has the exposure aperture 51, cassette chamber 41, and film take-up chamber 50. As well known, the main body 52 is formed with a front cover, a rear cover, a top cover, and a bottom cover (not shown). A spool drive mechanism and a shutter opener mechanism are assembled with the main body 52. The spool drive mechanism rotates the spool 13 of the photographic film cassette 8 in the film advance direction and in the film rewinding direction. The shutter opener mechanism rotates a shutter 16 of the photographic film cassette 8. The spool drive mechanism is constituted by a key shaft 53 and a plurality of gears 55 and a motor (not shown) for rotating the key shaft 53. The key shaft engages with the spool 13 via an opening 41a formed in an upper wall 52a of the cassette chamber 41. The shutter opener mechanism is constituted by a drive shaft 54 which engages with the end of the shutter 16 via an opening 41b, and a device for rotating the drive shaft 54 in response to an operation of a lock lever 48.

A circuit board 57 is disposed on the upper surface of the main body 52. In this embodiment, a flexible printed circuit board is used. This flexible printed circuit board 57 has two lands 57a and 57b and a connection part 57c interconnecting the two lands 57a and 57b. The land 57a is fixedly placed on the upper wall 52a of the cassette chamber 41 by means of small screws (not shown). The land 57a is shaped so as not to obstruct the motion of the gears 55 and formed with openings 56a and 56b into which the key shaft 53 and drive shaft 54 are inserted.

The land 57b has a microcomputer 58a and an EEPROM 58b. The microcomputer 58a sequentially controls the camera mechanism including the camera shutter, flash device, AF device, and the like. The microcomputer 58a executes a photographing mode for photographing sequence, and a data input/output processing mode for data transfer to and from an external apparatus. EEPROM 58b is a non-volatile memory electrically rewritable. To EEPROM 58b, data are written during or after manufacture, such as: photometric value correction data, range finding correction data, automatic flashing level, and battery check level.

The structure and function of the microcomputer 58a and EEPROM 58b are not directly relevant to the invention, and so the detailed description thereof is omitted. The detailed structure and function of microcomputer 58a and EEPROM 58b are described in the above-cited U.S. patent application Ser. No. 08/408,817.

A reflection type photosensor 59 constituted by a light emitting element and a light receiving element is mounted on the bottom surface of the land 57a. The reflection type photosensor 59 enters the opening 41c in the upper wall 52a and is exposed in the cassette chamber 41. The reflection type photosensor 59 faces the opening 29 in the cassette shell housed in the cassette chamber 41. While the bar code disk 27 rotates together with the spool 13, the reflection type photosensor 59 optically reads the bar code 28a through the opening 29. The obtained film information is sent to the microcomputer 58a.

On the bottom surface of the land 57a, a plurality of contacts 60a to 60e are formed which are exposed in the cassette chamber 41 via an opening 61 in the upper wall 52a. Each contact 60a to 60e is made of an exposed copper foil and directly connects a data input apparatus 65 to the microcomputer 58a for data read/write of EEPROM 58b. Since the contacts 60a to 60e are formed at the deepest area of the cassette chamber 41, it scarcely occurs that a user inadvertently touches them with fingers. Furthermore, since the cassette chamber 41 is closed by the bottom lid 42, conductivity of the contacts 60a to 60e is not degraded, as dusts or foreign materials are not attached. The contacts 60a to 60e can be accessed by merely opening the bottom lid 42.

For camera performance check or repair after the manufacture, an external apparatus, e.g., data input apparatus 65 is connected to the camera 34 and data read/write of EEPROM 58b is performed. The data input apparatus 65 is constituted by a connector 63, a console unit 66, and a cable 67 connecting the connector 63 and console unit 66.

The connector 63 has a cross sectional shape same as that of the cassette 10 shown in FIG. 1, and is slightly longer in the axial direction than the cassette 10. The rear end of the connector 63 completely housed in the cassette chamber 41 protrudes toward the outside of the cassette chamber 41 so that the connector 63 can be easily loaded or dismounted. Connector pins 64a to 64e protrude from a top face 63a of the connector 63. As the connector 63 is inserted into the cassette chamber 41, the connector pins 64a to 64e contact the contacts 60a to 60e via the opening 61 so that the microcomputer 58a and data input apparatus 65 are electrically connected.

The console unit 66 has alphanumeric keys 66a for entering data, function keys 66b for instructing data read/write and the like, and a liquid crystal display 66c for displaying operation sequence and data. The internal structure of this data input apparatus 65 is not directly relevant to the invention, and the description thereof is omitted.

For data read/write of EEPROM 58b, the lock lever 48 is first manipulated to open the bottom lid 42. Next, the connector 63 is inserted into the cassette chamber 41. The connector pins 64a to 64e of the connector 63 contact the contacts 60a to 60e via the opening 61. At this time, the microcomputer 58a is electrically connected to the data input apparatus 65. With this connection, the microcomputer 58a is set to the data input/output processing mode. The microcomputer 58a may be set to the data input/output processing mode upon key operation on the console unit 66.

In reading data, one of the function keys 66b on the console unit 66 is operated to instruct the microcomputer 58a to read data. The microcomputer 58a reads data from EEPROM 58b and sends it via the connector 63 to the console unit 66. The data is displayed on the liquid crystal display 66c of the console unit 66.

In writing data, another of the function keys 66b on the console unit 66 is operated to instruct the microcomputer 58a to write data. The microcomputer 58a notifies the data input apparatus 65 of the type of data to be first written. The type of data notified by the microcomputer 58a is displayed on the liquid crystal display 66c. At the same time, a notice of whether the data is corrected or not is also displayed on the liquid crystal display 66c. If the data is required to be corrected, the operator operates the alphanumerical keys 66a to input corrected data to the data input apparatus 65. When an input key is activated next, the microcomputer 58a fetches the data and writes it in EEPROM 58b. If the data is not necessary to be corrected, a proper one of the function keys 66b is operated and the next data input is performed.

After the data is corrected or after an instruction that the data correction is not necessary is made, the microcomputer 58a notifies the data input apparatus 65 of the type of data to be next corrected. The data is corrected in the above manner by operating upon the console unit 66.

After the data read or data write is completed, the connector 63 is pulled out of the cassette chamber 41 and the bottom lid 42 is closed. The microcomputer 58a enters a standby state after the termination of the data input/output processing mode.

In loading the photographic film cassette 8, the lock lever 48 is manipulated to open the bottom lid 42. As shown in FIG. 1, the photographic film cassette 8 is inserted into the cassette chamber 41 by pushing the cassette 8 in the axial direction of the spool 13, with the bar code disk 28 side being oriented toward the cassette chamber 41. When the bottom lid 42 is closed, the lock lever 48 reciprocates once. A return motion of the lock lever 48 opens the shutter 16 of the photographic film cassette 8.

In response to the lock of the bottom lid 42, the motor automatically starts rotating. The motor rotates the spool 13. As the spool 13 rotates, the leader of the photographic film 14 passes through the film mouth 23 and is advanced from the cassette 10. The leader of the photographic film 14 advances into the film take-up chamber, is captured by a take-up spool rotating in the take-up chamber, and wound about the outer periphery of the take-up spool. When the first frame of the photographic film 14 is set to the exposure aperture 51, the motor stops.

The bar code disk 28 rotates together with the spool 13. The bar code 28a of the bar code disk 28 is optically read with the reflection type photosensor 59. The obtained film information is sent to the microcomputer 58.

As well known, as the shutter button is activated, the microcomputer 58a executes the photographing mode. During execution of the photographing mode, the camera shutter is driven to form an image on the first frame. Thereafter, the motor rotates to wind the photographic film and set the second frame to the exposure aperture 51.

After images are formed on all frames, the motor is automatically driven to rotate the spool 13 in the reverse direction. As the spool 13 rotates in the reverse direction, the exposed photographic film 14 in the film take-up chamber 50 is wound around the spool 13. As the lock lever 48 is slid, the shutter 16 is closed to shield the inside of the cassette 10 from external light. Since the bottom lid 42 is opened as the lock lever 48 is slid, the photographic film cassette 8 can be pulled out of the cassette chamber 41.

The printed circuit board may by mounted in the interior of the cassette chamber instead of the exterior. In this case, the openings 41c and 61 in the upper wall 52a can be eliminated. Contact pins may be formed on the printed circuit board and corresponding contacts may be formed on the connector. The contacts may be formed in the inner wall of the cassette chamber.

Data may be directly read from or written to the memory without using the microcomputer. The invention is also applicable to a camera adapted to a photographic film cassette of type 135.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera with a cassette chamber for accommodating a photographic film cassette, the photographic film cassette having a cassette shell, a spool rotatively housed in the cassette shell, a photographic film wound about the spool, a bar code disk mounted on one end of the spool, and a window formed in a first end wall for exposing a bar code on the bar code disk, and the cassette chamber having an entrance via which the photographic film cassette is inserted in the axial direction of the spool and a first wall facing the first end wall, the photographic film being advanced by rotation of the spool outside of the cassette, the camera comprising:

a circuit board disposed at the outside of the first wall;

a photosensor mounted on said circuit board for optically reading the bar code via the window;

a memory storing plural sets of photographing data;

a plurality of contacts formed on said circuit board, said contacts to which an external apparatus for data read/write of said memory is connected; and at least one opening formed in said first wall for exposing said photosensor and said plurality of contacts in the cassette chamber.

2. A camera according to claim 1, wherein said at least one opening includes a first opening facing said photosensor and a second opening facing said plurality of contacts.

3. A camera according to claim 1, wherein said entrance is formed at the bottom of a camera body.

4. A camera according to claim 3, wherein the external apparatus has a connector having generally the same shape as the cassette, and a plurality of pins are disposed on an end face of the connector, the plurality of pins contacting the plurality of contacts.

5. A camera with a cassette chamber, a photographic film cassette being inserted via an entrance of the cassette chamber into the cassette chamber with a bar code disk side being headed, and a bar code disposed on the bar code disk being read by a photosensor mounted on a circuit board while the bar code disk rotates together with the spool of the photographic film cassette in the cassette chamber, the camera comprising:

a memory storing plural sets of photographing data; and a plurality of first contacts formed on the circuit board, said plurality of first contacts contacting a plurality of second contacts of an external apparatus when the external apparatus is housed in the cassette chamber, and the external apparatus performing data read/write of said memory.

6. A camera according to claim 5, wherein the external apparatus has a connector having the generally same shape as the cassette, and said plurality of second contacts are pins disposed on an end face of the connector.

* * * * *